June 21, 1932. J. C. HOLLOWAY 1,863,850
WELDING KEYS TO CAN ENDS
Filed Jan. 10, 1929   2 Sheets-Sheet 2
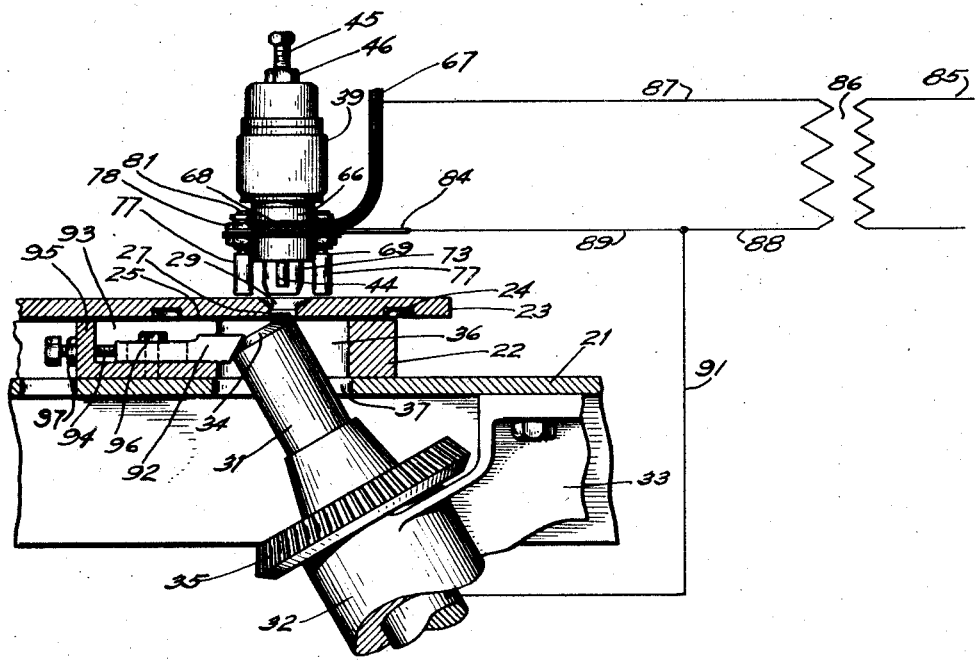
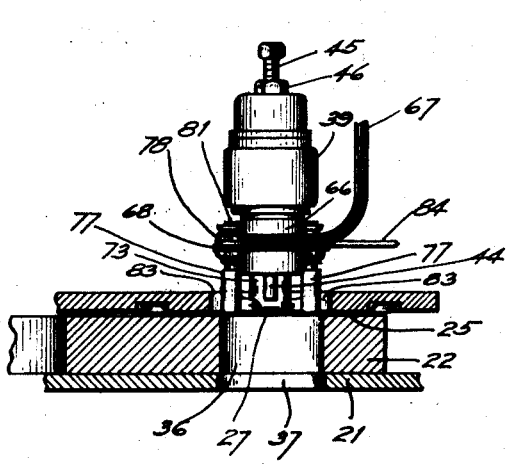
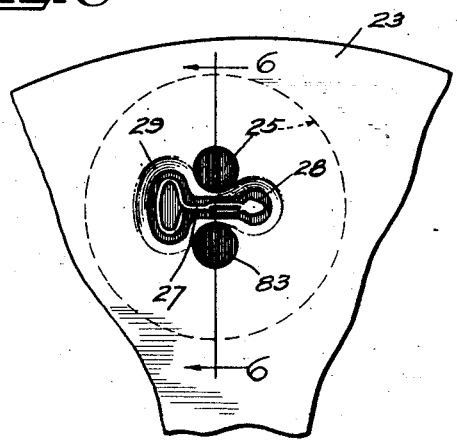
INVENTOR
Joseph C. Holloway
BY John C. Carpenter
ATTORNEY Patented June 21, 1932

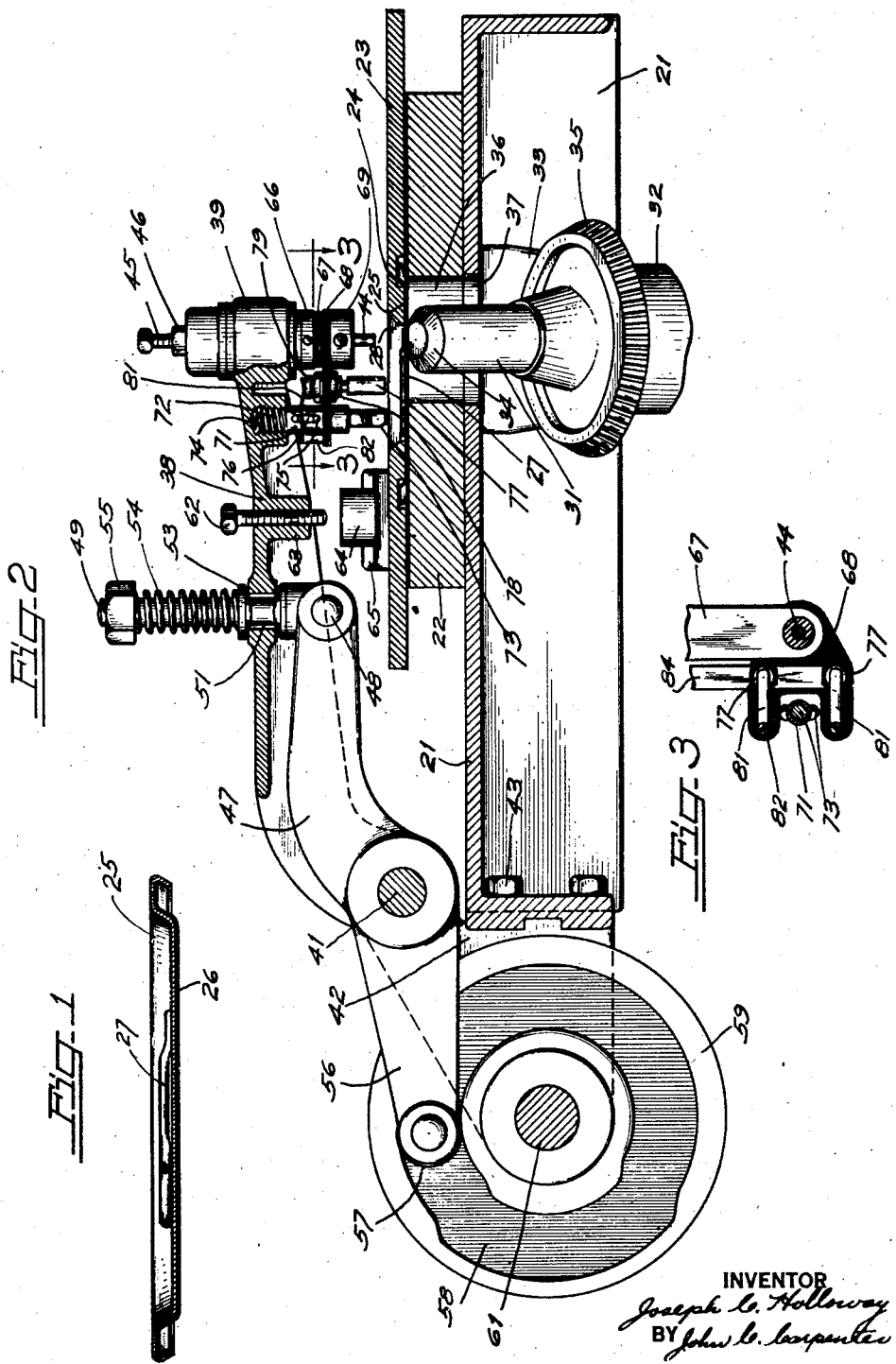

1,863,850

UNITED STATES PATENT OFFICE

JOSEPH C. HOLLOWAY, OF NEW ORLEANS, LOUISIANA, ASSIGNOR TO AMERICAN CAN COMPANY, OF NEW YORK, N. Y., A CORPORATION OF NEW JERSEY

WELDING KEYS TO CAN ENDS

Application filed January 10, 1929. Serial No. 331,563.

This invention relates in general to the attachment of tearing strip keys to can ends and has more particular reference to welding keys to can ends which have a surface lacquered or coated with a protective substance.

In the usual practice of welding keys to can ends, the assembled key and can end are positioned between electrodes and a high amperage welding current is passed through the key and can end and a part of the metal thereof within the path of the current is thereby fused to form the welding bond. Can ends used for cans, enameled or lacquered on the inside, are preferably formed from enameled or lacquered sheets and such ends have one surface covered with the protective coating. Usual commercial welding operations and methods are impractical for use with can ends of this character by reason of the insulating qualities of the protective coating which prevents the passage of sufficient electrical current to effect a welded union of the parts.

The principal object of the present invention is an improved method of welding two metal articles together, one of which has a surface provided with a protective non-metallic and electrically non-conductive coating. The method contemplates the temporary displacement of the coating to permit flow of the welding current.

Another important object of the invention is the provision of an apparatus for welding together articles of the character described which is of the usual or preferred type of welding apparatus with an additional means for softening a portion of the protective non-inductive coating on a part to be welded as an incident to providing a path of travel for a welding current.

A further important object of the invention is the provision, in a welding apparatus, of an electrical heating current automatically operating when the articles to be welded are clamped between the electrodes thereof, and an electrical welding current automatically operating after the first electrical current has performed its work.

A further important object of the invention is the provision of an apparatus of the character described wherein the electrode operating in connection with the coated surface of the article being welded is cleaned of any coating material which may become deposited thereon during the welding operation.

Numerous other objects and advantages of the invention will be apparent as it is better understood from the following description, which, taken in connection with the accompanying drawings, discloses a preferred embodiment thereof.

Referring to the drawings:

Figure 1 is a sectional view of a lacquered or coated can end with an opening key in position for operation by the apparatus disclosed herein;

Fig. 2 is a partial sectional longitudinal view of parts of a welding apparatus, parts being shown in elevation;

Fig. 3 is a partial section taken on the line 3—3 of Fig. 2;

Fig. 4 is a fragmental sectional view of the apparatus, parts being shown in full elevation, the view being taken at right angles to Fig. 2 and a wiring diagram also being shown in connection therewith;

Fig. 5 is a fragmental plan view of a turret with a can end and opening key in position for welding, and Fig. 6 is a partial section, taken along line 6—6 of Fig. 5 and also showing the upper welding head in elevation.

In the following description and in the claims, the term "lacquer" will be used to designate lacquer, enamel, paint, or any protective substance such as is commonly used for a coating on can ends or other metallic articles. In like manner, "lacquered can ends" designate can ends provided with lacquer, enamel, paint or other coatings.

In the drawings only sufficient mechanism is disclosed to fully illustrate the present invention, those parts directly associated with the electrodes of the welding apparatus being shown in some detail.

As illustrated in Fig. 2, the apparatus comprises a table 21 on which is mounted a support plate 22, which may be of circular form to accommodate a can end carrier 23 and which, in the drawings, is illustrated as a turret. The turret is provided with can receiving pockets 24 in which can ends 25 are conveyed into position for welding. Each can end 25 is provided with a lacquered coating 26, as disclosed in Fig. 1. The can end 25, with an opening key 27, is positioned within each of the pockets 24 of the turret 23 and upon step rotation of the turret, the can end 25 and the key 27 are moved over the upper surface of the support plate 22.

An apertured pocket 28 is cut through the turret 23 adjacent each can receiving pocket 24, the pocket 28 being formed with inclined edges 29 for properly centering the opening key 27 relative to the can end 25 (Fig. 5). As the can end 25 is brought to rest at the welding station of the present apparatus, it is positioned directly over the upper end of a lower electrode 31 rotating within a bearing 32 carried by a bracket 33 secured to the table 21.

A conical welding surface 34 is formed on the upper extremity of electrode 31 and the electrode is positioned angularly to the surface of table 21, as illustrated in Fig. 4. The angle of the welding surface 34 is formed to present a horizontal line of tangency to the lacquered surface 26 of the cover 25 as it rests in position at the welding station. The lower electrode 31 is rotated with a step movement in any suitable manner, as by connection with a bevel gear 35 secured to the electrode. In this position of the electrode, the upper extremity extends through an opening 37 formed in the table 21 and within an opening 36 formed in the support plate 22.

The welding head, which is positioned directly above the electrode 31, comprises an arm 38 which carries a welding head 39 and which is mounted on a pivot shaft 41 in a bracket 42 secured by bolts 43 to the table 21 (Fig. 2). Welding head 39 carries an upper electrode 44 adjustably held therein by a bolt 45 and a lock nut 46. Head 39 is raised and lowered in and out of welding position by movement of the arm 38 on shaft 41. The arm 38 is raised and lowered by a lever 47 oscillating on the shaft 41, the forward arm of the lever being pivotally connected at 48 with a rod 49 passing through an opening 51 formed in the arm 38.

A washer 53 surrounding the rod 49 rests upon the upper edge of arm 38 and engages a compression spring 54 held under adjusted compression by means of a nut 55 threadedly secured to the upper extremity of rod 49. The opposite end 56 of lever 47 carries a cam following roller 57 which operates within a groove 58 of a face cam 59 secured to a drive shaft 61 rotating within the bracket 42. Drive shaft 61 may be the principal drive shaft of an organized welding apparatus and is driven in any suitable manner.

By means of the associated parts just described, cam actuation of lever 47 causes a corresponding movement of the arm 38 to raise and lower the welding head 39. A stop bolt 62 is threaded within a boss 63 formed in arm 38 and is adapted to engage a boss 64 carried on a bracket 65 mounted on table 21. By adjusting the position of bolt 62 within arm 38, the lower position of welding head 39 can be exactly predetermined, the bolt 62 striking upon the boss 64 and stopping further downward movement of the head. At such time, the lever 47 continues to move its full stroke under the action of the cam 59 and spring 54 thereupon yields and permits separation of the forward end of lever 47 and the arm 38.

The welding head 39 carries a collar 66 which surrounds the electrode 44 and against which are clamped a series of laminated copper strips 67. These are held in position by an insulating plate 68 mounted over the electrode 44 and in turn clamped against the strips 67 by means of a collar 69 secured about the electrode 44.

A sleeve 71 is threadedly secured at 72 within the arm 38 and extends through the insulating plate 68. A key positioner bar 73 is slidably and yieldingly held within the sleeve 71. A coil spring 74 is secured within the upper end of the sleeve 71 and is interposed between a wall of the arm 38 and the upper end of the bar 73. A stop pin 75 projected from the bar 73 slides within a slot 76 cut in the wall of the sleeve 71 and limits the movement of the bar 73 within its sleeve 71.

As the welding head 39 is lowered, the key positioner bar 73, which is slightly tapered at its forward end, enters the loop or head of the opening key 27 and centers and holds the same in clamped position as spring 74 yields and permits sliding of the sleeve 71 over bar 73.

The welding head 39 also carries two contact pins 77 which slide within collared seats 78 carried by the insulating plate 68. The contact pins 77 are positioned on opposite sides of an imaginary line passing through the key positioner bar 73 and the upper electrode 44, as illustrated in Figs. 3 and 4. Each contact pin 77 is provided with an enlarged head 79 against which is held the free end of a leaf spring 81 secured on a post 82 carried by the insulating plate 68. When the welding head 39 is lowered, the contact pins 77 are moved within apertures 83 cut through the turret 23 (Fig. 5) and are brought into engagement with the upper surface of the positioned can end 25. Further downward movement of the welding head 39 is compensated for by a sliding of the seat 78 over each held contact pin 77, the spring 81 permitting this sliding movement. A copper conductor strip 84 passes over the upper surface of the insulating plate 68 and connects with the seats 78 of each contact pin 77.

With the can end 25 in position at the welding station and its lower surface 26 lightly engaging the welding surface 34 of the lower electrode 31 and with the key 27 positioned within the pocket 28 of the turret 23, a lowering action of the welding head 39 takes place. The key 27 is first engaged, centered and clamped by the key positioner bar 73, after which the contact pins 77 are brought into engagement with the upper surface of the can end 25. This action is immediately followed by the engagement of the upper electrode 44 with the positioned key 27. At this time, an electrical heating current is formed in the can end from one pin 77 to the other, and through the place of welding. As illustrated in Fig. 4, wire 85 constitutes the wiring for a primary circuit of a transformer 86 and wires 87 and 88 constitute the wires for the secondary or induced current of the transformer. Wire 87 is electrically connected with the laminated strips 67 and wire 88 is electrically connected with a wire 89 in electrical connection with strip 84. Upon the lowering of the welding head, as just described, the induced current of transformer 86 will flow through wire 87, strips 67, upper electrode 44, through the key 27 and through a part of the can end 25 to the contact pins 77, through the pins to the strip 84, wire 89 and wire 88 back to the transformer. A wire 91 is connected to wire 88 and forms an electrical conductor leading to the lower electrode 31.

Owing to the insulating quality of the lacquered surface 26, which is interposed between the welding surface 34 of the lower electrode 31 and the can end 25, the induced current from the transformer will not flow between the electrode 31 and the can end 25. The flow of current through the can end between the upper electrode 44 and contact pins 77, as just described, will immediately heat that part of the can end 25 that lies in the path of travel of the current. Owing to the high resistance of the can end body, the lacquer 26 along the path of travel of the current will become softened and partly melted. The welding head continues its downward movement and the relatively fixed upper electrode 44 carried thereby forces the key 27 and the can end 25 downwardly until the welding surface of the lower electrode engages the lower surface of the can end, the softened lacquer 26 in that position being squeezed out or pushed aside. This softening of the lacquer, followed by the squeezing action just described, takes place very rapidly, there being no pause in the descent of the welding head.

Immediately upon the forming of an electrical contact between the surface of can end 25 and welding face 34 of the lower electrode, a welding current will flow from transformer 86 along wire 87, strips 67, through upper electrode 44, key 27, can end 25, lower electrode 31, along wires 91 and 88 back to the transformer 86, thus completing the circuit. Inasmuch as the electrical current for this welding circuit passes along a relatively short line of travel between the two electrodes 44 and 31, the resistance in this circuit is much less than the resistance offered by the relatively extended line of travel of the heating current, and the latter current will thereupon be shunted and will cease its heating function.

As the lower electrode 31 is pushed through the protective coating 26, a certain amount of the coating will be displaced and in many instances will adhere to the welding surface 34 of the electrode. Inasmuch as the heating and welding operations are practically instantaneous, the softened lacquer on the can end 25 does not have time to set before the electrodes are separated following the welding operation.

Capillary attraction of the lacquer draws sufficient of the softened lacquer into the opening formed by the lower electrode to practically re-establish a continuous coating on the can end. In actual practice, it has been found that the place of weld in the can end under the protective coating 26 is hardly discernible owing to the fact that the lacquer has flowed into the opening made by the lower electrode during the welding operation.

Following the welding operation, the welding head 39 is raised and the natural spring in the can end 25 lifts the same to a position where it only lightly rests upon the welding surface 34 of the electrode 31. Said electrode is thereupon partially rotated by connection with the gear 35 and the turret 23 is moved to position a new can end and key at the welding station. This partial rotation of electrode 31 removes that portion of the welding surface 34 from welding position and presents a new portion of the surface 34 in position for subsequent contact with the succeeding can end.

Some of the softened and displaced lacquer adheres to the welding surface 34 of electrode 31 and must be removed before it is suitable for a subsequent welding operation and a scraper device is provided for this purpose. The scraper device is illustrated in Fig. 4 and comprises a scraper blade 92 slidably mounted within a slot 93 cut in the support 22. One end of the slot 93 communicates with the opening 36 formed in the support 22 and scraper blade 92 extends into the opening 36 and into non-radial engagement with the welding surface 34. Scraper blade 92 is slotted to permit adjustment toward and from the electrode 31. An adjusting screw 94 passes through a wall 95 formed in the support 22 adjacent the slot 93 and engages the rear end of the blade 92 to position it in correct engagement with the welding surface 34 of the electrode 31. A lock nut 97 threaded about screw 94 holds the same in adjusted position, and a clamping bolt 96 passing through the slot formed in the scraper blade 92 holds the same securely in position within its slot 93.

By means of the adjustment described, scraper blade 92 can be moved to take up wear in the wearing surface 34 of the electrode 31. As electrode 31 is turned about its axis, the surface 34 thereof is thus scraped clean of any lacquer which may adhere thereto and as the surface is again brought around into welding position, it is properly prepared for a subsequent welding operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for attaching opening keys to can ends, the combination of a support for an assembled key and can end, means for welding said key and can end together, and electrical means for heating said can end prior to the welding operation comprising two electrodes contactable with the can end at each side of the place of welding.

2. In an apparatus for attaching opening keys to can ends, the combination of welding electrodes for engaging an assembled key and can end, contact pins for engaging said can end, means providing an electrical heating current cooperating with the contact pins for preparing said can end for a welding operation, and means providing a welding current cooperating with the electrodes for welding the key and can end together.

3. In an apparatus for attaching opening keys to can ends, the combination of a support for an assembled key and can end, welding electrodes engaging the said key and can end, contact pins for engaging said can end, means providing an electrical heating current cooperating with the contact pins for preparing said can end for a welding operation, and means providing a welding current cooperating with the electrodes for welding the key and can end together.

4. In an apparatus for attaching opening keys to can ends, the combination of a turret, having on its under side seats for can ends and apertures for the keys above said seats, a support for the can end in said seat, an upper electrode moving within the aperture and engaging said key, a lower electrode positioned within an opening formed in the support and engaging said can end, contact pins moving within apertures formed in the turret, heating means cooperating with the contact pins for heating said can end held within the turret, and welding means cooperating with the electrodes for securing said key to said can end while so held.

5. An apparatus for attaching opening keys to lacquered can ends, comprising in combination a support for an assembled key and can end, electrodes engaging said key and can end, devices for conducting an electrical heating current to said can end held on said support whereby the lacquer thereon is softened, and means for welding the key and can end together after the lacquer is softened.

6. An apparatus for attaching opening keys to lacquered can ends, comprising in combination a support for an assembled key and can end, electrodes engaging said key and can end, contact pins for engaging said can end, means for heating a part of said can end adjacent the contact pins for softening the lacquer thereon, and means operating through the electrodes for welding the said key and can end together while the lacquer is soft.

7. An apparatus for attaching opening keys to lacquered can ends, comprising in combination a support for an assembled key and can end, electrodes positioned above and below said key and can end resting on the support, contact pins, devices moving the contact pins into engagement with said can end and moving the upper electrode into engagement with said key, heating means providing an electrical current cooperating with the contact pins and the upper electrode for melting a portion of the lacquer on said can end, said devices further moving the upper electrode and forcing the lower electrode through the melted lacquer into electrical contact with said can end, and welding means providing an electrical current cooperating with the electrodes for welding the key to the can end.

8. An apparatus for attaching opening keys to lacquered can ends, comprising the combination of electrodes positioned above and below an assembled key and a can end having a surface lacquered, heating means for softening a portion of the lacquer on said can end, devices for moving the electrodes into electrical contact with the key and the surface of the can end covered by the softened lacquer, and welding means for securing the key to the can end.

9. An apparatus for attaching opening keys to lacquered can ends, comprising the combination of electrodes positioned above and below an assembled key and a can end having a surface lacquered, heating means for softening a portion of the lacquer on said can end, devices for moving the first of the electrodes into electrical contact with the key and forcing the can end into electrical contact with the second electrode thereby displacing a portion of the softened lacquer, welding means cooperating with the electrodes for securing the key to the can end, and a scraper for cleaning the contact surface of said second electrode.

10. An apparatus for attaching opening keys to lacquered can ends, comprising the combination of electrodes positioned above and below an assembled key and a can end having a surface lacquered, heating means for softening a portion of the lacquer on said can end, devices for moving the first of the electrodes into electrical contact with the key and forcing the can end into electrical contact with the second electrode thereby displacing a portion of the softened lacquer, welding means cooperating with the electrodes for securing the key to the can end, means for rotating the second electrode about its axis, and a scraper for cleaning the contact surface of said second electrode during its rotation.

11. An apparatus for attaching opening keys to lacquered can ends, comprising the combination of electrodes positioned above and below an assembled key and a can end having a surface lacquered, heating means for softening a portion of the lacquer on said can end, devices for moving the first of the electrodes into electrical contact with the key and forcing the can end into electrical contact with the second electrode thereby displacing a portion of the softened lacquer, welding means cooperating with the electrodes for securing the key to the can end, means for changing the contact surface of the second electrode whereby any displaced lacquer adhering thereto is carried from welding position, and an adjustable scraper operating upon said contact surface for cleaning said electrodes.

12. An apparatus for attaching opening keys to lacquered can ends, comprising in combination a support for an assembled key and can end, electrodes positioned above and below said key and can end resting on the support, an arm to which the upper electrode is secured, contact pins yieldingly mounted on said arm, a bracket in which the lower electrode is rotatably mounted, an adjustable scraper for engaging a surface of the lower electrode, actuating devices for moving the arm and placing the electrode and contact pins carried thereby into engagement with the positioned key and can end, heating means comprising an electrical current cooperating with the contact pins and the upper electrode while so held for melting a portion of the lacquer on said can end, and welding means providing an electrical current cooperating with the electrodes for welding the key to the can end, and rotating means for moving welding surfaces of the lower electrode relative to the scraper for preparing the said electrode for the welding operation.

13. The process of attaching opening keys to lacquered can ends, which consists in arranging a key upon a lacquered can end, heating and softening a part of the lacquer on said can end, removing the softened lacquer from the place where the welding current is to be established and welding the key to the can end while the lacquer is so removed.

14. The process of attaching opening keys to lacquered can ends which consists in positioning a lacquered can end with a superimposed key between electrodes, melting a part of the lacquer on said can end, forcing the electrodes into electrical contact with the key and can end by moving an electrode through the melted lacquer, and welding the key to the can end.

15. The process of attaching opening keys to lacquered can ends, which consists in positioning a lacquered can end with a superimposed key between electrodes, removing a portion of the lacquer on the can end and exposing the surface thereof while forcing one electrode into contact with the key and another into contact with the exposed surface of the end, and welding the key to the can end by passing an electrical current through the electrodes.

16. The process of attaching opening keys to lacquered can ends, which consists in arranging a key upon a lacquered can end, temporarily displacing a part of the lacquer on said can end and welding the key to the can end.

17. The process of attaching opening keys to lacquered can ends, which consists in arranging a key upon a lacquered can end, softening a part of the lacquer on said can end, and welding the key to the can end while the lacquer is soft.

18. In an apparatus for attaching together can parts the combination of a support for aligned can parts, means for welding said parts together, and electrical means for heating a can part prior to the welding operation, said heating means comprising two electrodes contactable with the can part at each side of the place of welding.

JOSEPH C. HOLLOWAY.